United States Patent
Ji (10) Patent No.: US 11,616,630 B2
(45) Date of Patent: Mar. 28, 2023

(54) METHOD FOR COMMUNICATION BETWEEN USER EQUIPMENTS AND USER EQUIPMENT

(71) Applicant: VIVO MOBILE COMMUNICATION CO., LTD., Guangdong (CN)

(72) Inventor: Zichao Ji, Dongguan (CN)

(73) Assignee: VIVO MOBILE COMMUNICATION CO., LTD., Dongguan (CN)

( * ) Notice: Subject to any disclaimer, the term of this patent is extended or adjusted under 35 U.S.C. 154(b) by 73 days.

(21) Appl. No.: 17/168,647

(22) Filed: Feb. 5, 2021

(65) Prior Publication Data

US 2021/0160037 A1 May 27, 2021

Related U.S. Application Data

(63) Continuation of application No. PCT/CN2019/099006, filed on Aug. 2, 2019.

(30) Foreign Application Priority Data

Aug. 6, 2018 (CN) .......................... 201810886594.9

(51) Int. Cl.
*H04L 5/00* (2006.01)
*H04W 72/02* (2009.01)

(52) U.S. Cl.
CPC .......... *H04L 5/0094* (2013.01); *H04L 5/0041* (2013.01); *H04W 72/02* (2013.01)

(58) Field of Classification Search
CPC .... H04L 5/0094; H04L 5/0041; H04W 72/02; H04W 72/04; H04W 72/0446; H04W 72/0453

(Continued)

(56) References Cited

U.S. PATENT DOCUMENTS 11,336,390 B2 *  5/2022  Lee ................... H04W 72/1289
2011/0044239 A1  2/2011  Cai et al.
(Continued)

FOREIGN PATENT DOCUMENTS

CN    102823150 A    12/2012
CN    103650394 A    3/2014
(Continued)

OTHER PUBLICATIONS

Supplementary European Search Report regarding International Application No. 19848470.1-1205/3832937, PCT/CN2019/099006, dated Sep. 1, 2021.
"Sidelink carrier aggregation for LTE V2V communication," Intel Corporation, 3GPP TSG RAN WG1 Meeting #89, R1-1707300, dated May 19, 2017.
(Continued)

*Primary Examiner* — Candal Elpenord
(74) *Attorney, Agent, or Firm* — Harness, Dickey & Pierce, P.L.C.

(57) ABSTRACT

A method for communication between user equipments includes: determining, by a user equipment (UE), a physical control channel resource of a first frequency; and transmitting, by the UE, first control information on a physical control channel of the first frequency; wherein the first control information includes frequency indication information and/or resource indication information of a second frequency, the frequency indication information of the second frequency is used to indicate the second frequency, and the resource indication information of the second frequency is used to indicate an allocated/reserved resource of the second frequency.

19 Claims, 4 Drawing Sheets

(58) Field of Classification Search
USPC .................................................. 370/329–330
See application file for complete search history.

(56) References Cited

U.S. PATENT DOCUMENTS

| | | | |
|---|---|---|---|
| 2016/0157238 A1 | 6/2016 | Lee et al. | |
| 2017/0202043 A1* | 7/2017 | Seo | H04W 72/02 |
| 2019/0045521 A1* | 2/2019 | Hong | H04W 56/001 |
| 2020/0053675 A1* | 2/2020 | Khoryaev | H04L 5/0048 |
| 2020/0068534 A1* | 2/2020 | Li | H04L 5/001 |

FOREIGN PATENT DOCUMENTS

| | | |
|---|---|---|
| CN | 108271162 A | 7/2018 |
| EP | 3018855 A1 | 5/2016 |

OTHER PUBLICATIONS

"3rd Generation Partnership Project; Technical Specification Group Radio Access Network; Evolved Universal Terrestrial Radio Access (E-UTRA); Multiplexing and channel coding (Release 15)," 3GPP Standard; Technical Specification, 3GPP TS 36.212 V15.2.1, Jul. 11, 2018.

International Search Report and Written Opinion of the International Searching Authority regarding International Patent Application No. PCT/CN2019/099006, dated Oct. 12, 2019. Translation provided by Bohui Intellectual Property.

First Office Action regarding Chinese Patent Application No. 201810886594.9, dated Jul. 1, 2020. Translation provided by Bohui Intellectual Property.

"Addition of V2X Phase 2 based on LTE in 36.213, s14," Motorola Mobility, LG, 3GPP TSG RAN WG1 Meeting #93, R1-1807411, May 21-25, 2018.

* cited by examiner

METHOD FOR COMMUNICATION BETWEEN USER EQUIPMENTS AND USER EQUIPMENT

CROSS-REFERENCE TO RELATED APPLICATIONS

This application is a Bypass Continuation Application of PCT/CN2019/099006 filed on Aug. 2, 2019, which claims priority to Chinese Patent Application No. 201810886594.9 filed on Aug. 6, 2018, which are incorporated herein by reference in their entirety.

TECHNICAL FIELD

The present disclosure relates to the field of communications technologies, and in particular, to a method for communication between user equipments and a user equipment.

BACKGROUND

A Long Term Evolution (LTE) system supports sidelink since the Release 12, which allows direct communication between user equipments (UEs). When the UEs need to communicate directly with each other through multiple component carriers (CCs), a receiving UE needs to sense and blindly detect the physical sidelink control channel (PSCCH) on each carrier to obtain indication information of an allocated/reserved resource of each CC.

Since sidelink operates in a half-duplex operation mode, when the UE transmits information on one CC, the UE may not be able to receive information on other CCs, especially in scenarios where two CCs are in a same frequency band. In addition, when the UE hops among different CCs, the UE may not be able to receive and transmit between relevant CCs. These will result in a transceiving conflict when the receiving UE performs independent sensing and blind detection on multiple CCs, which limits a transmitting or receiving capability of the UE on multiple CCs.

When the number of CCs configured by a sidelink system exceeds the number of CCs for simultaneous reception or transmission supported by the UE, the number of CCs sensed or received by the UE is limited, which may cause that the UE misses data transmitted by other UEs, and that the UE cannot make full use of all of the available spectrum resources, nor can the UE select a best resource to receive and transmit data.

During the vehicle to everything (V2X) services performed by the UE using the sidelink, a typical working mode is that basic security services is performed on some CCs such as the CCs of LTE, and that advanced V2X services with low latency and massive amounts of data, such as advanced (automatic) driving and sensor extension, are supported on the other CCs, such as the CC of new radio (NR). If the number of CCs for simultaneous reception or transmission supported by the UE is not sufficient, the UE may be forced to monitor the basic services only on some CCs for a long time, which causes the failure of the advanced V2X services.

SUMMARY

Embodiments of the present disclosure provide a method for communication between user equipments and a user equipment. In order to provide a basic understanding of some aspects of the disclosed embodiments, the following presents a simple summary. The summary is not an extensive overview, and not intended to identify key/critical elements or describe the scope of protection of such embodiments. Its only purpose is to present some concepts in a simple form as a preface to the later detailed description.

In a first aspect, a method for communication between user equipments is provided, which includes: determining, by the UE, a physical control channel resource of a first frequency; and transmitting, by the UE, first control information on a physical control channel of the first frequency; wherein the first control information includes frequency indication information and/or resource indication information of a second frequency, the frequency indication information of the second frequency is used to indicate the second frequency, and the resource indication information of the second frequency is used to indicate an allocated/reserved resource of the second frequency.

Optionally, the first control information further includes frequency indication information and/or resource indication information of the first frequency; wherein the frequency indication information of the first frequency is used to indicate the first frequency, and the resource indication information of the first frequency is used to indicate an allocated/reserved resource of the first frequency.

Optionally, the method further includes: transmitting, by the UE, second control information on the physical control channel of the first frequency; wherein the second control information includes frequency indication information and/or resource indication information of the first frequency; the frequency indication information of the first frequency is used to indicate the first frequency, and the resource indication information of the first frequency is used to indicate the allocated/reserved resource of the first frequency.

Optionally, the first control information and the second control information have a same format or size; or, the first control information and the second control information have different formats and sizes.

Optionally, in a case where the first control information and the second control information have the same format or size, an independent domain in the first control information is used as frequency indication information and/or resource indication information; or a reserved bit in the first control information is used as frequency indication information and/or resource indication information; or a set domain in the first control information is used as frequency indication information and/or resource indication information; or the frequency indication information and/or the resource indication information are jointly encoded with at least one of other domains in the first control information; or the frequency indication information and/or the resource indication information are used to scramble a cyclic redundancy check (CRC) of the first control information.

Optionally, the physical control channel includes a physical sidelink control channel (PSCCH); and the allocated/reserved resource of the second frequency includes a PSCCH resource, or a physical sidelink shared channel (PSSCH) resource, or a PSCCH resource and a PSSCH resource.

Optionally, after the UE transmits the first control information, the method further includes: transmitting data on a PSSCH of the second frequency; or transmitting control information on a PSCCH of the second frequency; or transmitting data on a PSSCH of the second frequency and transmitting control information on a PSCCH.

Optionally, the method further includes determining, by the UE, the first frequency and/or the second frequency by one or more of the following ways:

determining the first frequency and/or the second frequency according to configurations of a higher layer;

selecting the first frequency and/or the second frequency according to service requirements;

selecting the first frequency and/or the second frequency according to a configured priority;

selecting the first frequency and/or the second frequency according to a signal intensity or a signal quality;

selecting the first frequency and/or the second frequency according to an interference condition or an occupation ratio of a frequency;

determining the first frequency and/or the second frequency according to network configurations;

randomly selecting the first frequency and/or the second frequency; and determining the first frequency and/or the second frequency according to a pseudo-random function.

In a second aspect, a method for communication between UEs is provided, which includes: sensing and/or monitoring, by a UE, a physical control channel on a first frequency to obtain first control information; wherein the first control information includes frequency indication information and/or resource indication information of a second frequency; and the frequency indication information of the second frequency is used to indicate the second frequency, and the resource indication information of the second frequency is used to indicate an allocated/reserved resource of the second frequency.

Optionally, the physical control channel includes a PSCCH; and the allocated/reserved resource of the second frequency includes a PSCCH resource, or a PSSCH resource, or a PSCCH resource and a PSSCH resource.

Optionally, the method further includes: monitoring, by the UE according to indication of the first control information, a PSCCH of the second frequency, and decoding the PSCCH to obtain third control information; or, receiving, by the UE, a PSSCH of the second frequency according to the indication of the first control information; or monitoring, by the UE according to the indication of the first control information, a PSCCH of the second frequency; decoding the PSCCH to obtain the third control information; and receiving a PSSCH of the second control information.

Optionally, the third control information includes resource indication information of the PSSCH of the second frequency.

Optionally, the method further includes: receiving, by the UE according to indication of the third control information, the PSSCH of the second frequency; or, comparing, by the UE, the PSSCH resource of the second frequency indicated by the third control information with the PSSCH resource of the second frequency indicated by the first control information; and performing a preset operation if the two are different.

Optionally, the method further includes: selecting, by the UE, one or more frequencies from the frequencies indicated by the first control information and/or the third control information to receive the PSSCH.

Optionally, the UE selects, according to at least one of priority, quality of service (QoS), and a transmission mode, one or more frequencies to receive the PSSCH.

Optionally, the method further includes: reporting, by the UE, available resources on the second frequency.

Optionally, the first frequency is a frequency of a first sidelink transmission mode, and the second frequency is a frequency of a second sidelink transmission mode; or, both the first frequency and the second frequency are frequencies of the first sidelink transmission mode.

In a third aspect, a UE is provided, which includes a processor and a transceiver. The processor is used to determine a physical control channel resource of a first frequency; and the transceiver is used to transmit first control information on a physical control channel of the first frequency; wherein the first control information includes frequency indication information and/or resource indication information of a second frequency, the frequency indication information of the second frequency is used to indicate the second frequency, and the resource indication information of the second frequency is used to indicate an allocated/reserved resource of the second frequency.

Optionally, the transceiver is further used to transmit second control information on the physical control channel of the first frequency; wherein the second control information includes frequency indication information and/or resource indication information of the first frequency; and the frequency indication information of the first frequency is used to indicate the first frequency, and the resource indication information of the first frequency is used to indicate an allocated/reserved resource of the first frequency.

Optionally, the physical control channel includes a PSCCH; and the allocated/reserved resource of the second frequency includes a PSCCH resource, or a PSSCH resource, or a PSCCH resource and a PSSCH resource.

Optionally, after transmitting the first control information, the transceiver is further used to transmit data on a PSSCH of the second frequency; or to transmit control information on a PSCCH of the second frequency; or to transmit data on a PSSCH of the second frequency and control information on a PSCCH of the second frequency.

Optionally, the processor is further used to determine the first frequency and/or the second frequency using one or more of the following ways:

determining the first frequency and/or the second frequency according to configurations of a higher layer;

selecting the first frequency and/or the second frequency according to service requirements;

selecting the first frequency and/or the second frequency according to a configured priority;

selecting the first frequency and/or the second frequency according to a signal intensity or a signal quality;

selecting the first frequency and/or the second frequency according to an interference condition or an occupation ratio of a frequency;

determining the first frequency and/or the second frequency according to network configurations; and randomly selecting the first frequency and/or the second frequency, or determining the first frequency and/or the second frequency according to a pseudo-random function.

In a fourth aspect, a UE is provided, which includes a transceiver. The transceiver includes a first unit used to sense and/or monitor a physical control channel of a first frequency; and a second unit used to obtain first control information from the physical control channel; where the first control information includes frequency indication information and/or resource indication information of a second frequency, the frequency indication information of the second frequency is used to indicate the second frequency, and the resource indication information of the second frequency is used to indicate an allocated/reserved resource of the second frequency.

Optionally, the transceiver further includes a third unit. The third unit is used to monitor a PSCCH of the second frequency according to indication of the first control information, and decode the PSCCH to obtain third control information, or used to receive a PSSCH of the second frequency, or used to monitor a PSCCH of the second frequency, decode the PSCCH to obtain the third control information, and receive a PSSCH of the second frequency.

Optionally, the third control information includes resource indication information of the PSSCH of the second frequency.

Optionally, the UE further includes a processor. The processor is used to control, according to indication of the third control information, the transceiver to receive a PSSCH of the second frequency; or used to compare a PSSCH resource of the second frequency indicated by the third control information with a PSSCH resource of the second frequency indicated by the first control information; and to perform a preset operation if the two are different.

Optionally, the processor is further used to select one or more frequencies from the frequencies indicated by the first control information and/or the third control information to receive the PSSCH.

Optionally, the processor selects one or more frequencies, according to at least one of priority, QoS, and a transmission mode, to receive the PSSCH.

Optionally, the transceiver is further used to report available resources on the second frequency.

In a fifth aspect, a UE is provided, which includes a transceiver, a processor, a bus, and a memory. The transceiver is used to communicate and interact with other UEs; the processor is configured to support execution of corresponding functions of the UE in the first aspect; and the memory is coupled with the processor and stores necessary program instructions and data of the UE in the first aspect.

In a sixth aspect, a UE is provided, which includes a transceiver, a processor, a bus, and a memory. The transceiver is used to communicate and interact with other UEs, and the processor is configured to support execution of corresponding functions of the UE in the second aspect. The memory is coupled with the processor and stores necessary program instructions and data of the UE in the second aspect.

In a seventh aspect, a computer-readable medium is provided, which stores thereon an instruction program that, when executed by a processor, implements any of the aforementioned methods for communication between the UEs.

In the embodiments of the present disclosure, a transmitting UE is able to perform cross-frequency resource allocation or reservation, and a receiving UE is able to sense and blindly detect a resource only on one of the frequencies to obtain resource allocation or reservation results of other frequencies, thereby solving problems that a multi-frequency-point transmission or receiving capability of the UE is limited and a transceiving capability between the UEs is not matched. For a single UE, a transceiving conflict problem caused by independent resource sensing of the plurality of frequencies may be avoided by obtaining, on one frequency, resource allocation or reservation results of other frequencies. Since the UE may camp on any frequency to obtain the resource allocation/reservation results of other frequencies, allocating the UE to perform resource sensing on different frequencies may support a load balance among the plurality of frequencies, avoid an interference, and be helpful to the UE in selecting the best frequency band for transceiving. When the UE uses sidelink for V2X services, even if the multi-frequency-point transmission or receiving capability of the UE is limited, it ensures that different V2X services can be carried out simultaneously.

It will be understood that, the above general description and the following detailed description are exemplary and explanatory only and do not limit the present disclosure.

BRIEF DESCRIPTION OF THE DRAWINGS

Accompanying drawings herein are incorporated in and constitute a part of the specification, show embodiments in accordance with the present disclosure, and are used together with the specification to explain the principles of the present disclosure.

DETAILED DESCRIPTION

The following description and accompanying drawings sufficiently illustrate specific embodiments of the present disclosure to enable those skilled in the art to practice them. Other embodiments may include structural, logical, electrical, process, and other changes. The embodiments merely represent possible variations. Individual components and functions are optional, and the sequence of operations may be changed, unless explicitly required otherwise. Parts and features of some embodiments may be included in or substituted for parts and features of other embodiments. The scope of embodiments of the present disclosure includes the entire scope of the claims, and all available equivalents of the claims that may be obtained. Herein, the embodiments may be represented individually or collectively by the term "disclosure", which is merely for convenience, and not intended to automatically limit the scope of the application to any single embodiment or embodiment concept if more than one embodiment is in fact disclosed. Herein, relational terms such as first, second, and the like may be used to distinguish one entity or term from another entity or term only, and do not require or imply any actual relationship or order between such entities or terms. Moreover, the terms such as "comprise", and "include", or any other variants thereof herein are intended to cover a non-exclusive inclusion, so that a process, a method, an article or a device that includes a series of elements not only includes those elements, but also includes other elements not explicitly listed, or includes elements inherent to the process, the method, the article or the device. In a case where there is no more limitation, an element defined by the phrase "comprising a/an . . . " does not exclude existence of other identical elements in a process, a method, an article, or a device that includes the element. Embodiments herein are described in a progressive manner, and each embodiment focuses on differences from other embodiments, and the same and similar parts of the embodiments can be referred to one another. For the method, the product, etc., disclosed by the embodiments, the description is simple because the method and the product correspond to the method part disclosed by the embodiments, and the relevant parts can be referred to the description of the method part.

The embodiments herein may be supported by standard documents published for at least one of the following wireless access systems: the 3rd Generation Partnership Project (3GPP), 3GPP LTE, LTE-advanced (LTE-A), the 3rd Generation Partnership Project 2 (3GPP 2), and Institute of Electrical and Electronics Engineers (IEEE) 802. Steps or parts not described to clarify technical features herein may be supported by those documents. Further, all terms herein may be explained by the standard documents.

A UE herein includes a vehicle, a drivers mobile terminal, and a pedestrians mobile terminal that are specified in V2X communication standard. Further, a road side unit (RSU) specified in the V2X may also be the UE herein unless otherwise specified.

A transmitting first user equipment (UE1), a receiving second user equipment (UE2), and a receiving third user equipment (UE3) herein may be collectively referred to as UEs.

Frequency herein should be broadly understood, for example, each frequency may be a CC, or a bandwidth part (BWP), or a resource pool.

The character "I" herein indicates an "or" relationship. "A and/or B" indicates three cases: A, B, or A and B. For example, "a first frequency and/or a second frequency" indicates a first frequency, or a second frequency, or a first frequency and a second frequency; and "frequency indication information and/or resource indication information" indicates frequency indication information, or resource indication information, or frequency indication information and resource indication information.

The frequency indication information herein is used to indicate a corresponding frequency. For example, frequency indication information of a first frequency is used to indicate the first frequency, and frequency indication information of a second frequency is used to indicate the second frequency.

Resource indication information herein is used to indicate an allocated/reserved resource of a corresponding frequency or on a channel. For example, resource indication information of a first frequency is used to indicate an allocated/reserved resource of the first frequency, and resource indication information of a second frequency is used to indicate an allocated/reserved resource of the second frequency.

Figure 1:
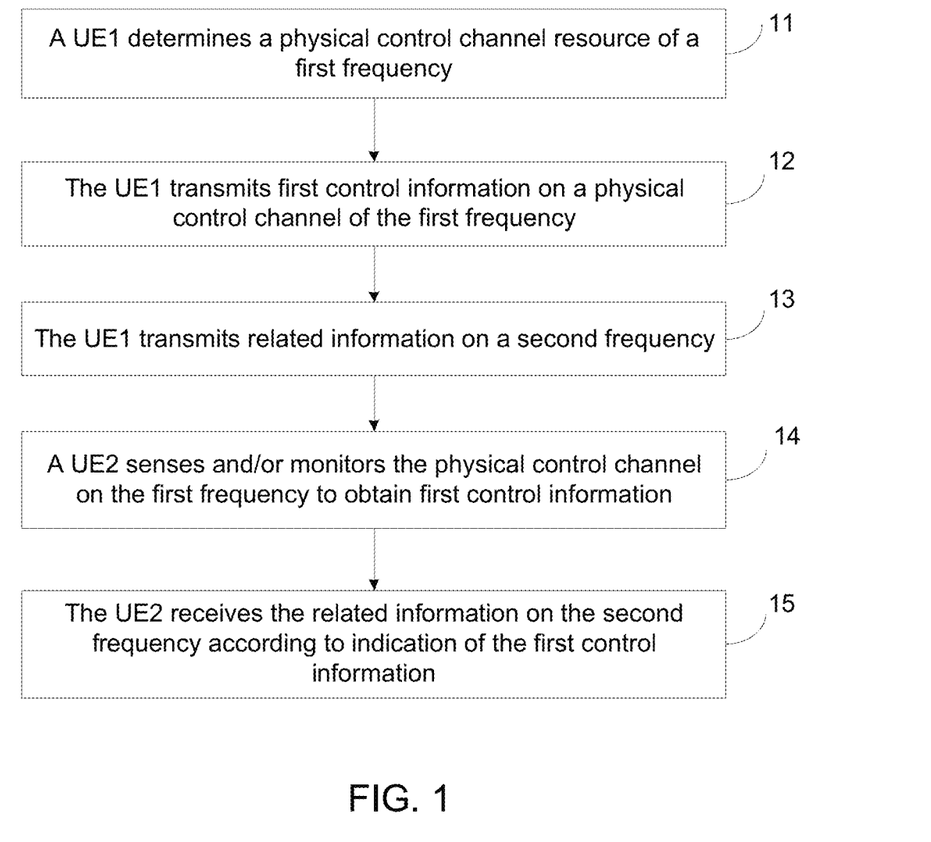
FIG. 1 is an optional schematic flow of communication between UEs.

FIG. 1 shows an optional method for communication between user equipments.

In step 11, a UE1 determines a physical control channel resource of a first frequency.

In different communication systems, there are a variety of physical control channels in different standard specifications. The physical control channel herein generally refers to a channel of the physical layer that can be used to transmit resource indication information.

Optionally, the physical control channel includes a PSCCH.

Optionally, a way of determining, by a transmitting UE, a PSCCH resource of the first frequency includes: determining, by the transmitting UE, the PSCCH resource of the first frequency according to scheduling or configuration of a network side; or competing, by the transmitting UE, in a set PSCCH resource pool to select and determine the PSCCH resource of the first frequency. Similarly, the transmitting UE may also determine a PSSCH resource of the first frequency according to scheduling or configuration of the network side, or by competing in a PSSCH resource pool.

In step 12, the UE1 transmits first control information on the physical control channel of the first frequency. The first control information includes frequency indication information and/or resource indication information of a second frequency. The frequency indication information of the second frequency is used to indicate the second frequency, and the resource indication information of the second frequency is used to indicate an allocated/reserved resource of the second frequency. In this way, it is possible to allow a receiving UE to obtain resource allocation/reservation information of a cross frequency according to indication of the first control information after obtaining the first control information on the first frequency.

Optionally, the allocated/reserved resource of the second frequency includes a PSSCH resource, or a PSCCH resource, or a PSSCH resource and a PSCCH resource.

Optionally, the allocated/reserved resource includes time domain of the resource, or frequency domain of the resource, or spatial domain of the resource, or the time domain and the frequency domain of the resource, or the time domain and the spatial domain of the resource, or the frequency domain and the spatial domain of the resource, or the time domain, the frequency domain and the spatial domain of the resource. The time domain of the resource includes at least one of an offset, a pattern, a duration and a periodicity. The frequency domain of the resource includes at least one of a subcarrier frequency, a subcarrier spacing, and a resource block location. The spatial domain of the resource includes antenna beam information.

There are many ways for the UE to transmit control information on a physical control channel of the first frequency. Optionally, the UE transmits sidelink control information (SCI) on a PSCCH of the first frequency. The SCI includes frequency indication information and/or resource indication information of the second frequency. Optionally, the UE transmits a scheduling assignment (SA) on a PSCCH of the first frequency. The SA includes frequency indication information and/or resource indication information of the second frequency.

In step 13, the UE1 transmits related information on the second frequency.

Optionally, if there is an allocated/reserved PSSCH resource on the second frequency, the UE1 transmits data on a PSSCH of the second frequency.

Optionally, if there is an allocated/reserved PSSCH resource on the second frequency, the UE1 transmits the SCI on a PSCCH of the second frequency. The SCI includes resource indication information of a PSSCH of the second frequency.

Optionally, if there is an allocated/reserved PSSCH resource on the second frequency, the UE1 transmits data on a PSSCH of the second frequency and transmits the SCI on a PSCCH of the second frequency. The SCI includes the resource indication information of a PSSCH of the second frequency.

In step 14, a UE2 senses and/or monitors the physical control channel on the first frequency to obtain the first control information. The first control information includes the frequency indication information and/or resource indication information of the second frequency.

It will be noted that, monitoring the physical control channel is an optional detection way that may be adopted by the receiving UE, and blind detection is another optional detection way that may be adopted by the receiving UE. Herein, monitoring the physical control channel and blindly detecting the physical control channel may be understood consistently. That is, monitoring the physical control channel herein also includes a technical means of blindly detecting the physical control channel.

The UE2 senses the physical control channel on the first frequency, or monitors the physical control channel on the first frequency, or monitors and senses the physical control channel on the first frequency, to obtain the first control information.

Optionally, the physical control channel includes a PSCCH, and the first control information includes SCI or an SA.

Optionally, the allocated/reserved resource of the second frequency includes a PSSCH resource, or a PSCCH resource, or a PSSCH resource and a PSCCH resource.

In step 15, the UE2 receives related information on the second frequency according to the indication of the first control information.

Optionally, in a case where the first control information includes resource indication information of a PSCCH of the second frequency, the UE2 monitors the PSCCH of the second frequency, and decodes the PSCCH to obtain third control information. The third control information includes resource indication information of the PSSCH of the second frequency. According to indication of the third control information, the UE2 receives the PSSCH of the second frequency and receives data transmitted by the UE1.

Optionally, if the first control information includes resource indication information of a PSSCH of the second frequency, the UE2 receives the PSSCH of the second frequency.

Optionally, if the first control information includes resource indication information of a PSCCH and a PSSCH of the second frequency, the UE2 monitors and decodes the PSCCH of the second frequency to obtain the third control information, and receives the PSSCH of the second frequency. Since the first control information may indicate the PSSCH resource of the second frequency, and the third control information may also indicate the PSSCH resource of the second frequency, in this way, the UE2 may obtain indication information of the PSSCH resource of the second frequency from the first control information and the third control information, respectively. In this case, the purpose of transmission check may be achieved, by the UE2 through comparing the PSSCH resource of the second frequency indicated by the third control information with the PSSCH resource of the second frequency indicated by the first control information. If the two are the same, it indicates that information transmission between the UE2 and the UE1 is correct. If the two are different, it indicates that an error occurs in the information transmission between the UE2 and the UE1. In this case, relevant operation such as giving up continuous reception of the PSSCH of the second frequency, or re-receiving the PSCCH or the PSSCH of the second frequency, need to be performed according to a preset strategy.

The UE2 may obtain resource allocation/reservation information of a plurality of frequencies according to the indication of the first control information and/or the third control information. If the UE2 can support simultaneous reception/transmission on all of these frequencies, the UE2 may receive/transmit data on all of these frequencies. If the number of frequencies exceeds the number of frequencies for simultaneous reception or transmission that the can UE2 support, optionally, the UE2 may select one or more frequencies from the frequencies indicated by the first control information and/or the third control information to receive the PSSCH. The UE2 will give up receiving a PSSCH on a frequency that is not selected. In this way, the UE2 may select a most important resource for data transceiving, which not only can make full use of all available spectrum resources, but also will not miss data transmitted by other UEs. Optionally, the UE2 selects one or more frequencies to receive the PSSCH according to one or a combination of a priority, QoS and a transmission mode.

Optionally, the priority may be the priority of a frequency or the priority of a transmission service.

There are many ways for the UE2 to obtain the priority, the QoS, and the transmission mode.

Optionally, the first control information includes one or more of the priority, the QoS, and the transmission mode. The UE2 may obtain these information through the first control information.

Optionally, the UE2 may obtain one or more of the priority, the QoS, and the transmission mode through configurations of a higher layer.

Optionally, the priority and/or transmission mode is predefined.

In addition, after obtaining the resource allocation/reservation information of the plurality of frequencies according to the indication of the first control information and/or the third control information, the UE2 may determine available resources and unavailable resources on the second frequency. Optionally, the UE2 reports the available resources on the second frequency to the higher layer.

Optionally, the first frequency and the second frequency are frequencies of a same sidelink transmission mode. For example, the first frequency and the second frequency are both CCs/BWPs of an LTE sidelink transmission mode, or both CCs of an NR sidelink transmission mode.

Optionally, the first frequency and the second frequency are frequencies of different sidelink transmission modes. For example, the first frequency is CC/BWP of the LTE sidelink transmission mode, and the second frequency is CC/BWP of the NR sidelink transmission mode; or the first frequency is CC/BWP of the NR sidelink transmission mode, and the second frequency is CC/BWP of the LTE sidelink transmission mode. The UE may transmit the SCI on the CC/BWP of the LTE sidelink transmission mode to indicate allocation or reservation of the CC/BWP of the NR sidelink transmission mode. Therefore, the UE may obtain a resource allocated to advanced V2X services on the CC/BWP of the NR sidelink transmission mode simultaneously when sensing and blindly detecting basic security services on the CC/BWP of the LTE sidelink transmission mode.

By adopting the aforementioned optional embodiments, the transmitting UE may perform cross-frequency resource allocation or reservation, and the receiving UE may perform resource sensing and blind detection only on one frequency to obtain resource allocation or reservation results of other frequencies, thereby solving problems that the multi-frequency-point transmission or receiving capability of the UE is limited and the transceiving capability between the UEs is not matched. For a single UE, a transceiving conflict problem caused by independent resource sensing of the plurality of frequencies may be avoided by obtaining, on a frequency, the resource allocation or reservation results of other frequencies. Since the UE may camp on any frequency to obtain the resource allocation/reservation results of other frequencies, allocating the UE to perform resource sensing on different frequencies may support a load balance among the plurality of frequencies, avoid interference, and be helpful to the UE in selecting a best frequency band for transceiving. When the UE uses sidelink for V2X services, even if the multi-frequency-point transmission or receiving capability of the UE is limited, it may also ensure that different V2X services can be carried out simultaneously.

In another optional embodiment, the UE1 may also transmit the second control information on the physical control channel of the first frequency. The second control information includes frequency indication information and/or resource indication information of the first frequency. The frequency indication information of the first frequency is used to indicate the first frequency, and the resource indication information of the first frequency is used to indicate an allocated/reserved resource of the first frequency.

In the present embodiment, the UE1 transmits resource indication information of a cross frequency and resource indication information of the present frequency through the first control information and the second control information, respectively.

In an optional way, the second control information adopts the format of the control information in standard specifications including the SCI in standard specifications; and the first control information also adopts the format of the control information in standard specifications including the SCI in standard specifications. Thus, a plurality of pieces of control information carry the resource indication information, and formats and sizes of the plurality of pieces of control information are the same. In order to enable the receiving UE to distinguish a frequency corresponding to each control information, optionally, the UE1 transmits the plurality of pieces of control information in a set sequence. For example, the first piece of control information transmitted by the UE1 is the second control information corresponding to the present frequency, and the second piece of control information transmitted by the UE1 is the first control information corresponding to a cross frequency. According to a receiving sequence, the UE2 may determine the frequency corresponding to each control information, and distinguish the first control information from the second control information. By indicating the frequency corresponding to each control information through a transmission sequence of the control information, it is unnecessary for the method to change the format of the control information in the related art.

In another optional way, a slight modification is made to the control information in standard specifications. Optionally, frequency indication information is added into the control information in standard specifications. For example, a reserved bit in the control information in standard specifications may be used for frequency indication. The first control information transmitted by the UE1 on the physical control channel of the first frequency includes the frequency indication information of the second frequency, and the second control information includes the frequency indication information of the first frequency. According to the frequency indication information in each control information, the UE2 may determine the frequency corresponding to each control information, and distinguish the first control information from the second control information. In this way, by slightly changing the control information in standard specifications, the frequency corresponding to each control information is indicated.

In another optional way, for the second control information used for self-scheduling of the first frequency, the control information in standard specifications including the SCI in standard specifications may be adopted; and for the first control information used for cross-frequency scheduling of the second frequency, it may be determined based on the modification of the control information (including the SCI in standard specifications) in the standard specifications.

In another optional embodiment, in addition to the resource indication information of the second frequency, resource indication information of other frequencies may be also included in the first control information transmitted by the UE1 on the physical control channel of the first frequency. For example, the first control information further includes the resource indication information of the first frequency, or the resource indication information of the first frequency and other frequencies. In a case where resource indication information of two or more frequencies is included in the first control information, the first control information may be determined based on the modification of the control information (including the SCI in standard specifications) in standard specifications.

There are many ways to determine the first control information based on the modification of the control information (including the SCI in standard specifications) in standard specifications. Optionally, the first control information and the control information in standard specifications have the same format or size; or, the first control information and the second control information have different formats and sizes. In a case where the formats or sizes of the first control information and the control information in standard specifications are the same, the resource of the second frequency may be indicated by the first control information in various ways.

Optionally, an independent domain in the control information in standard specifications may be used as the frequency indication information and/or the resource indication information.

Optionally, a reserved bit in the control information in standard specifications may be used as the frequency indication information and/or the resource indication information.

Optionally, a set domain in the control information in standard specifications may be used as the frequency indication information and/or the resource indication information.

Optionally, the frequency indication information and/or the resource indication information are jointly encoded with at least one of other domains.

Optionally, in the control information in standard specifications, a specific domain used as the frequency indication information and/or the resource indication information may be independently encoded or jointly encoded. In a case where an indication domain is jointly encoded, the indication domain may also be used to indicate at least one of a transmission type, a service type, a transmission priority, response information (e.g., ACK/NACK), a hybrid automatic repeat request (HARQ) process identifier, a resource allocation, and a modulation and coding scheme MCS. That is, the frequency indication information and/or the resource indication information are jointly encoded with at least one of the transmission type, the service type, the transmission priority, the response information, the HARQ process identifier, the resource allocation, and the modulation and coding scheme MCS.

Optionally, the frequency indication information and/or the resource indication information are used to scramble a CRC. In an optional embodiment of obtaining the frequency indication information and/or the resource indication information by CRC scrambling/descrambling, through scheduling configuration of a network side or other ways, the receiving UE may obtain in advance, frequency indication information of one or more available frequencies (e.g., frequency indication information of a frequency 1, a frequency 2, and a frequency 3) and resource indication information of available resources on the available frequencies (e.g., resource indication information of available resources on the frequency 1, resource indication information of available resources on the frequency 2, and resource indication information of available resources on the frequency 3). In this way, after receiving the information transmitted by the transmitting UE, the receiving UE may perform the CRC descrambling on the received information by sequentially using the frequency indication information of each frequency and/or the resource indication information of the available resources on each frequency. It is possible to accurately descramble indication information of the received information, i.e., the frequency indication information and/or the resource indication information transmitted by the transmitting UE. Optionally, the receiving UE may perform the CRC descrambling on each frequency in sequence according to at least one of the priority, the QoS, or the transmission mode.

In another optional embodiment, the method for communication between the UEs further includes determining, by the UE1, the second frequency. There are many ways to determine the second frequency, and none of them is conventional or general. Optionally, the second frequency is determined according to configurations or service requirements of a higher layer. Optionally, the second frequency is selected according to a configured priority. Optionally, the second frequency is selected according to a signal intensity or a signal quality. Optionally, the second frequency is selected according to the interference condition or the occupation ratio of the frequency. Optionally, the second frequency is determined according to the network configurations. Optionally, the second frequency is selected randomly. Optionally, the second frequency is allocated according to the pseudo-random function. Similarly, the first frequency may also be determined by using the above optional ways.

The following will describe the method for communication between the UEs in more detail by taking an example where a frequency is a CC.

Figure 6:
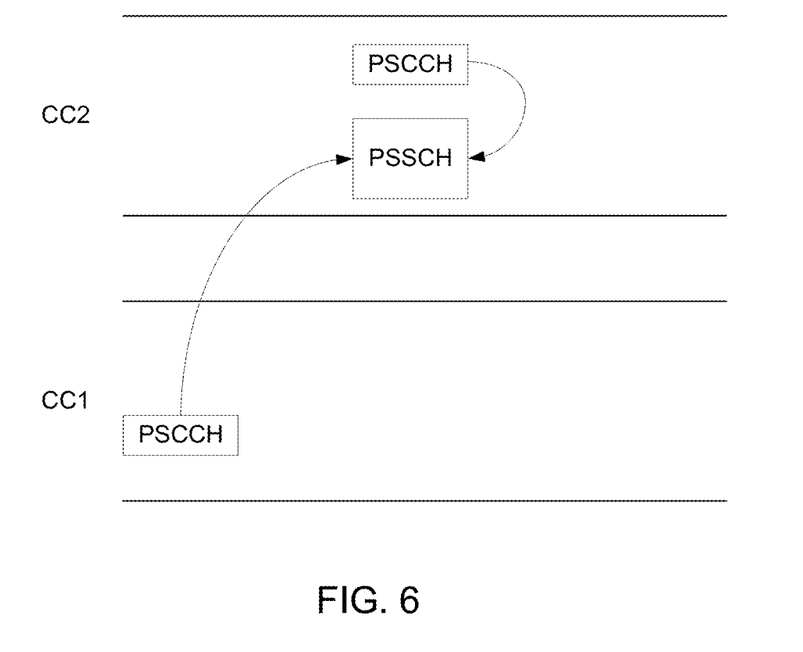
FIG. 6 is an optional schematic diagram of communication between UEs.

In an optional embodiment, as shown in FIG. 6, UE1, UE2, and UE3 are all configured with and enable a sidelink for transmission. The UE1 is configured with two CCs, i.e., a CC1 and a CC2. The CC1 and the CC2 may be sidelink CCs of a same communication system. For example, the CC1 and the CC2 are both sidelink CCs of LTE or NR. The CC1 and the CC2 may also be in different modes, for example, the CC1 is an LTE sidelink and the CC2 is an NR sidelink.

The UE1 transmits SCI-1 on a PSCCH of the CC1 and SCI-2 on a PSCCH of the CC2. Both the SCI-1 and the SCI-2 include resource indication information of a PSSCH of the CC2. The SCI-1 includes cross-frequency indication information indicating resource allocation on the CC2.

The UE2 senses and blindly detects the PSCCH on the CC1, and decodes the PSCCH to obtain the SCI-1. The SCI-1 indicates that there is a PSSCH resource allocated on the CC2. According to the indication, the UE2 receives and decodes the PSSCH on the CC2.

The UE3 senses and blindly detects the PSCCH on the CC2, and decodes the PSCCH to obtain the SCI-2. The SCI-2 indicates that there is a PSSCH resource allocated on the CC2. According to the indication, the UE3 receives and decodes the PSSCH on the CC2.

In this optional embodiment, each frequency is described by taking CC as an example, but ways such as a BWP or a resource pool are also applicable. Information such as time domain of the resource, and/or frequency domain of the resource, and/or spatial domain of the resource are indicated in the SCI.

Figure 7:
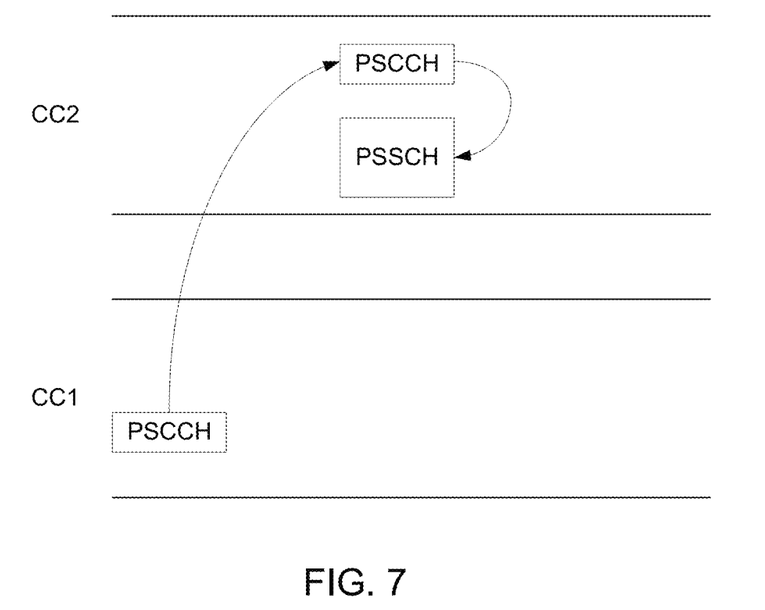
FIG. 7 is an optional schematic diagram of communication between UEs.

In another optional embodiment, as shown in FIG. 7, UE1, UE2, and UE3 are all configured with and enable a sidelink for transmission. The UE1 is configured with two CCs, i.e., a CC1 and a CC2, wherein the CC1 is an LTE sidelink and the CC2 is an NR sidelink. The UE1 transmits SCI-1 on a PSCCH of the CC1 and SCI-2 on a PSCCH of the CC2. The SCI-1 includes indication information of the SCI-2 on the CC2, and the SCI-2 indicates allocation of a PSSCH on a same CC.

The UE2 senses and blindly detects the PSCCH on the CC1, and decodes the PSCCH to obtain the SCI-1; receives the PSCCH on the CC2 according to indication of the SCI-1, and decodes the PSCCH to obtain the SCI-2; and receives and decodes a PSSCH on the CC2 according to indication of the SCI-2.

The UE3 senses and blindly detects the PSCCH on the CC2, and decodes the PSCCH to obtain the SCI-2. The SCI-2 indicates that the PSSCH is allocated on the CC2. According to the indication, the UE3 receives and decodes the PSSCH on the CC2.

Figure 8:
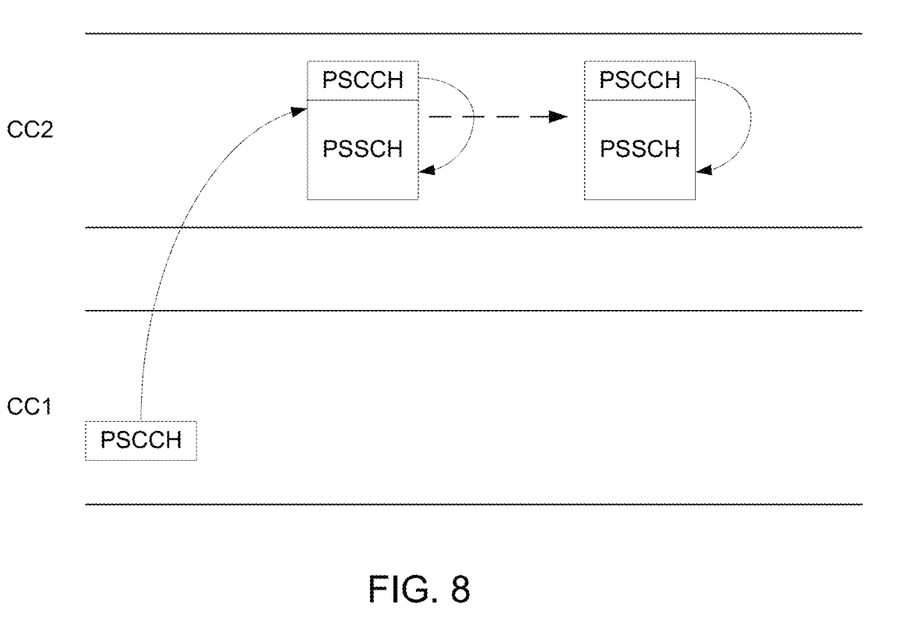
FIG. 8 is an optional schematic diagram of communication between UEs.

In another optional embodiment, as shown in FIG. 8, UE1, UE2, and UE3 are all configured with and enable a sidelink for transmission. The UE1 is configured with two CCs, wherein the CC1 is an LTE sidelink, and the CC2 is an NR sidelink.

The UE1 transmits SCI-1 on a PSCCH of the CC1 and SCI-2 on a PSCCH of the CC2. The SCI-1 indicates that a resource on the CC2 is reserved for subsequent transmission, and the resource is used for multiplexed transmission of the PSCCH and the PSSCH. At the reserved resource, the SCI-2 indicates an actual allocated PSSCH.

The UE2 senses and blindly detects the PSCCH on the CC1, decodes the PSCCH to obtain SCI-1. According to the indication of the SCI-1, the UE2 obtains the resource that the UE1 reserves on the CC2. The UE2 detects the PSCCH on the resource reserved on the CC2, decodes the PSCCH to obtain the SCI-2, and further receives and decodes the PSCCH on the CC2 according to indication of the SCI-2.

The UE3 senses and blindly detects the PSCCH on the CC2, and decodes the PSCCH to obtain the SCI-2. The SCI-2 indicates that the PSSCH is allocated on the CC2. The UE3 receives and decodes the PSSCH on the CC2 according to the indication.

Although the aforementioned optional embodiments are described by taking two CCs as an example, the method is also applicable to more CCs.

By adopting the aforementioned optional embodiments, the transmitting UE may perform cross-frequency resource allocation or reservation, and the receiving UE may perform resource sensing and blind detection only on one frequency to obtain resource allocation or reservation results of other frequencies, thereby solving problems that the multi-frequency-point transmission or receiving capability of the UE is limited and the transceiving capability between the UEs is not matched. For a single UE, a transceiving conflict problem caused by independent resource sensing of the plurality of frequencies may be avoid by obtaining, on a frequency, the resource allocation or reservation results of other frequencies. Since the UE may camp on any frequency to obtain resource allocation/reservation results of other frequencies, allocating the UE to perform resource sensing on different frequencies may support a load balance among the plurality of frequencies, avoid an interference, and be helpful to the UE in selecting the best frequency band for transceiving. When the UE uses the sidelink for V2X services, even if the multi-frequency-point transmission or receiving capability of the UE is limited, it may also ensure that different V2X services can be simultaneously carried out.

Figure 2:
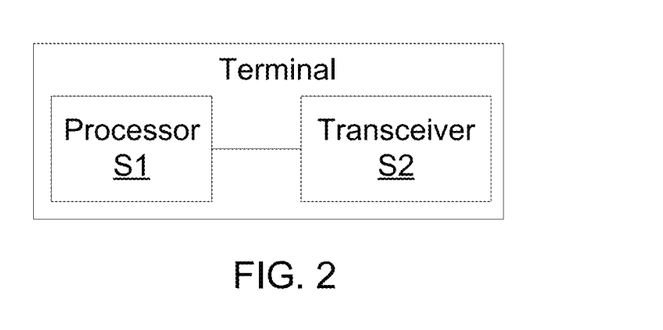
FIG. 2 is an optional schematic block diagram of a transmitting UE.

FIG. 2 shows a schematic structure of a transmitting UE, and the transmitting UE includes a processor 51 and a transceiver S2. The processor 51 is used to determine a physical control channel resource of a first frequency, and the transceiver S2 is used to transmit first control information on a physical control channel of the first frequency. Optionally, the transceiver S2 is further used to transmit second control information on the physical control channel of the first frequency. In this way, after obtaining the first control information on the first frequency, the receiving UE may obtain resource allocation/reservation information of a cross frequency according to the indication of the first control information.

Optionally, the physical control channel includes a PSCCH.

There are many ways to transmit control information on a physical control channel of the first frequency. Optionally, the transceiver S2 transmits SCI on a PSCCH of the first frequency. The SCI includes frequency indication information and/or resource indication information of the second frequency. Optionally, the UE transmits an SA on a PSCCH of the first frequency. The SA includes the frequency indication information and/or resource indication information of the second frequency.

Optionally, the allocated/reserved resource of the second frequency includes a PSCCH resource, or a PSSCH resource, or a PSCCH resource and a PSSCH resource.

Optionally, a way of determining a PSCCH resource of the first frequency includes determining the PSCCH resource of the first frequency according to scheduling or configuration of a network side; or competing in a set PSCCH resource pool to select and determine the PSCCH resource of the first frequency. Similarly, a PSSCH resource of the first frequency may also be determined according to scheduling or configuration of the network side, or by competing in a PSSCH resource pool.

Optionally, after transmitting the first control information, the transceiver S2 is further used to transmit data on a PSSCH of the second frequency; or transmit control information on a PSCCH of the second frequency; or transmit data on a PSSCH of the second frequency and transmit control information on a PSCCH of the second frequency.

Optionally, if there is an allocated/reserved PSSCH resource on the second frequency, the transceiver S2 transmits data on a PSSCH of the second frequency.

Optionally, if there is an allocated/reserved PSCCH resource on the second frequency, the transceiver S2 transmits the SCI on a PSCCH of the second frequency. The SCI includes the resource indication information of a PSSCH of the second frequency.

Optionally, if there is an allocated/reserved PSCCH resource on the second frequency, the transceiver S2 transmits data on a PSSCH of the second frequency and transmits the SCI on a PSCCH of the second frequency. The SCI includes the resource indication information of the PSSCH of the second frequency.

Optionally, the processor 51 is further used to determine the first frequency and/or the second frequency by one or more of the following ways:

determining the first frequency and/or the second frequency according to configurations of a higher layer;

selecting the first frequency and/or the second frequency according to service requirements;

selecting the first frequency and/or the second frequency according to a configured priority;

selecting the first frequency and/or the second frequency according to a signal intensity or a signal quality;

selecting the first frequency and/or the second frequency according to an interference condition or an occupation ratio of a frequency;

determining the first frequency and/or the second frequency according to network configurations; and randomly selecting the first frequency and/or the second frequency, or determining the first frequency and/or the second frequency according to a pseudo-random function.

In another optional embodiment, the transceiver S2 may also transmit the second control information on the physical control channel of the first frequency. In this embodiment, the transmitting UE transmits resource indication information of a cross frequency and resource indication information of the present frequency through the first control information and the second control information, respectively.

In another optional embodiment, in addition to the resource indication information of the second frequency, resource indication information of other frequencies may be also included in the first control information transmitted by the transceiver S2 on the physical control channel of the first frequency. For example, the first control information further includes the resource indication information of the first frequency, or the resource indication information of the first frequency and other frequencies. In a case where resource indication information of two or more frequencies is included in the first control information, the first control information may be determined based on a modification of the control information (including the SCI in standard specifications) in standard specifications.

Figure 3:
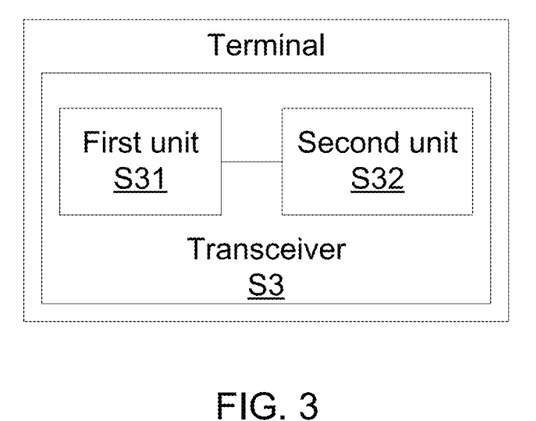
FIG. 3 is an optional schematic block diagram of a receiving UE.

FIG. 3 shows a schematic structure of a receiving UE. The receiving UE includes a transceiver S3, and the transceiver S3 includes a first unit S31 and a second unit S32.

The first unit S31 is used to sense and/or monitor a physical control channel on a first frequency, and the second unit S32 is used to obtain first control information from the physical control channel.

Optionally, the physical control channel includes a PSCCH and the first control information includes SCI or an SA.

Optionally, the allocated/reserved resource of the second frequency includes a PSSCH resource, or a PSCCH resource, or a PSSCH resource and a PSCCH resource.

Optionally, the transceiver S3 further includes a third unit. The third unit is used to monitor a PSCCH of the second frequency according to indication of the first control information and decode the PSCCH to obtain third control information, or used to receive a PSSCH of the second frequency, or used to monitor a PSCCH of the second frequency, decode the PSCCH to obtain the third control information, and receive a PSSCH of the second frequency. The third control information includes resource indication information of the PSSCH of the second frequency.

Optionally, the receiving UE further includes a processor. The processor is used to control, according to indication of the third control information, the transceiver S3 to receive a PSSCH of the second frequency; or used to compare a PSSCH resource of the second frequency indicated by the third control information with a PSSCH resource of the second frequency indicated by the first control information, and to perform a preset operation if the two are different.

The receiving UE may obtain resource allocation/reservation information of a plurality of frequencies according to the indication of the first control information and/or the third control information. If the receiving UE can support simultaneous reception/transmission on all of these frequencies, the receiving UE may receive/transmit data on all of these frequencies. If the number of frequencies exceeds the number of frequencies for simultaneous reception or transmission that the receiving UE can support, optionally, a processor of the receiving UE may select one or more frequencies from the frequencies indicated by the first control information and/or the third control information to receive the PSSCH. The receiving UE will give up receiving a PSSCH on a frequency that is not selected. In this way, the receiving UE may select a most important resource for data transceiving, which not only can make full use of all available spectrum resources, but also will not miss data transmitted by other UEs. Optionally, the receiving UE selects one or more frequencies to receive the PSSCH according to one or a combination of a priority, QoS and a transmission mode.

Optionally, the priority may be the priority of a frequency or the priority of a transmission service.

There are many ways for the UE2 to obtain the priority, the QoS, and the transmission mode.

Optionally, the first control information includes one or more of the priority, the QoS, and the transmission mode. The UE2 may obtain these information through the first control information.

Optionally, the UE2 may obtain one or more of the priority, the QoS, and the transmission mode through configurations of a higher layer.

Optionally, the priority and/or the transmission mode is predefined.

In addition, after obtaining the resource allocation/reservation information of the plurality of frequencies according to the indication of the first control information and/or the third control information, the receiving UE may determine available resources and unavailable resources on the second frequency. Optionally, the receiving UE reports the available resources on the second frequency to the higher layer.

Optionally, in a case where the first control information includes resource indication information of a PSCCH of the second frequency, the third unit monitors a PSCCH of the second frequency, and decodes the PSCCH to obtain the third control information. The third control information includes the resource indication information of a PSSCH of the second frequency. According to the indication of the third control information, the third unit receives the PSSCH of the second frequency and receives data transmitted by the transmitting UE.

Optionally, if the first control information includes the resource indication information of a PSSCH of the second frequency, the third unit receives the PSSCH of the second frequency.

Optionally, if the first control information includes the resource indication information of a PSCCH and a PSSCH of the second frequency, the third unit monitors and decodes the PSCCH of the second frequency to obtain the third control information, and receives the PSSCH of the second frequency. Since the first control information may indicate the PSSCH resource of the second frequency, and the third control information may also indicate the PSSCH resource of the second frequency, in this way, the processor may obtain indication information of the PSSCH resource of the second frequency from the first control information and the third control information, respectively. In this case, the processor may achieve the purpose of transmission check by comparing the PSSCH resource of the second frequency indicated by the third control information with the PSSCH resource of the second frequency indicated by the first control information. If the two are the same, it indicates that the information transmission between the transmitting UE and the receiving UE is correct. If the two are different, it indicates that an error occurs in the information transmission between the transmitting UE and the receiving UE. In this case, relevant operations such as giving up continuous reception of the PSSCH of the second frequency, or re-receiving the PSCCH or the PSSCH of the second frequency, need to be performed according to a preset strategy.

Optionally, the first frequency and the second frequency are frequencies of a same sidelink transmission mode. For example, the first frequency and the second frequency are both CCs/BWPs of an LTE sidelink transmission mode, or both CCs of an NR sidelink transmission mode.

Optionally, the first frequency and the second frequency are frequencies of different sidelink transmission modes. For example, the first frequency is the CC/BWP of the LTE sidelink transmission mode, and the second frequency is the CC/BWP of the NR sidelink transmission mode; or the first frequency is the CC/BWP of the NR sidelink transmission mode, and the second frequency is the CC/BWP of the LTE sidelink transmission mode. The UE may transmit SCI on the CC/BWP of the LTE sidelink transmission mode to indicate allocation or reservation of the CC/BWP of the NR sidelink transmission mode. Therefore, the UE may obtain a resource allocated to advanced V2X services on the CC/BWP of the NR sidelink transmission mode simultaneously when sensing and blindly detecting basic security services on the CC/BWP of the LTE sidelink transmission mode.

By adopting the aforementioned optional embodiments, the transmitting UE may perform cross-frequency resource allocation or reservation, and the receiving UE may perform resource sensing and blind detection only on one frequency to obtain resource allocation or reservation results of other frequencies, thereby solving problems that the multi-frequency-point transmission or receiving capability of the UE is limited and the transceiving capability between the UEs is not matched. For a single UE, a transceiving conflict problem caused by independent resource sensing of the plurality of frequencies may be avoided by obtaining, on one frequency, the resource allocation or reservation results of other frequencies. Since the UE may camp on any frequency to obtain the resource allocation/reservation results of other frequencies, allocating the UE to perform resource sensing on different frequencies may support a load balance among the plurality of frequencies, avoid an interference, and be helpful to the UE in selecting the best frequency band for transceiving. When the UE uses the sidelink for V2X services, even if the multi-frequency-point transmission or receiving capability of the UE is limited, it may also ensure that different V2X services can be carried out simultaneously.

In an optional way, the second control information adopts the format of the control information in standard specifications including the SCI in standard specifications; and the first control information also adopts the format of the control information in standard specifications including the SCI. Thus, a plurality of pieces of control information carry the resource indication information, and the formats and the sizes of the plurality of pieces of control information are the same. In order to enable the receiving UE to distinguish a frequency corresponding to each control information, optionally, the transceiver S2 of the transmitting UE transmits the plurality of pieces of control information in a set sequence. For example, the first piece of control information transmitted by the transceiver S2 is the second control information corresponding to the present frequency, and the second piece of control information transmitted by the transceiver S2 is the first control information corresponding to a cross frequency. According to a receiving sequence, the transceiver S3 of the receiving UE may determine the frequency corresponding to each control information, and distinguish the first control information from the second control information. By indicating the frequency corresponding to each control information through a transmission sequence of the control information, it is unnecessary for the method to change the format of the control information in the related art.

In another optional way, a slight modification is made to the control information in standard specifications. Optionally, frequency indication information is added into the control information. For example, a reserved bit in the control information in standard specifications may be used for frequency indication. The first control information transmitted by the transceiver S2 of the transmitting UE on the physical control channel of the first frequency includes indication information of the second frequency, and the second control information includes indication information of the first frequency. According to the frequency indication information in each control information, the processor of the receiving UE may determine the frequency corresponding to each control information, and distinguish the first control information from the second control information. In this way, by slightly changing the control information in standard specifications, the frequency corresponding to each control information is indicated.

Figure 4:
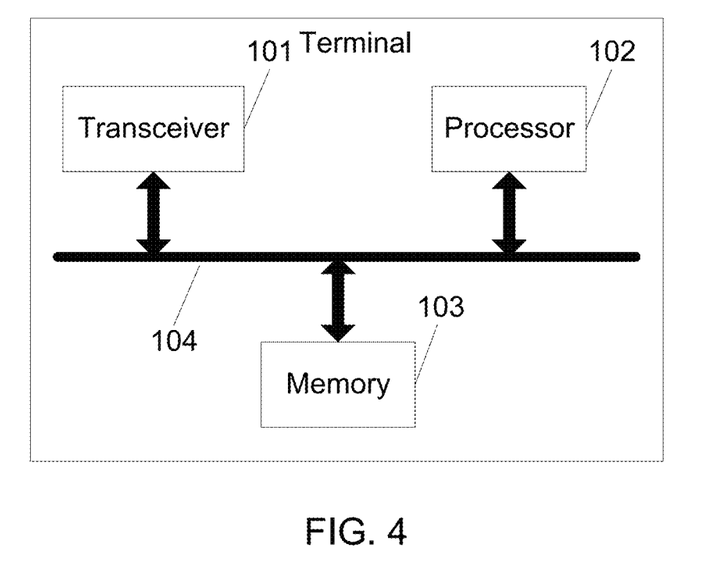
FIG. 4 is another optional schematic block diagram of a transmitting UE.

FIG. 4 shows a schematic structure of a transmitting UE. A UE includes a transceiver 101, a processor 102, a bus 104 and a memory 103. The transceiver 101 is used to communicate and interact with other UEs. The processor 102 is configured to support execution of corresponding functions of the transmitting UE1 in FIG. 1. The memory 103 is coupled with the processor 102 and stores necessary program instructions and data of the transmitting UE1 in FIG. 1.

Figure 5:
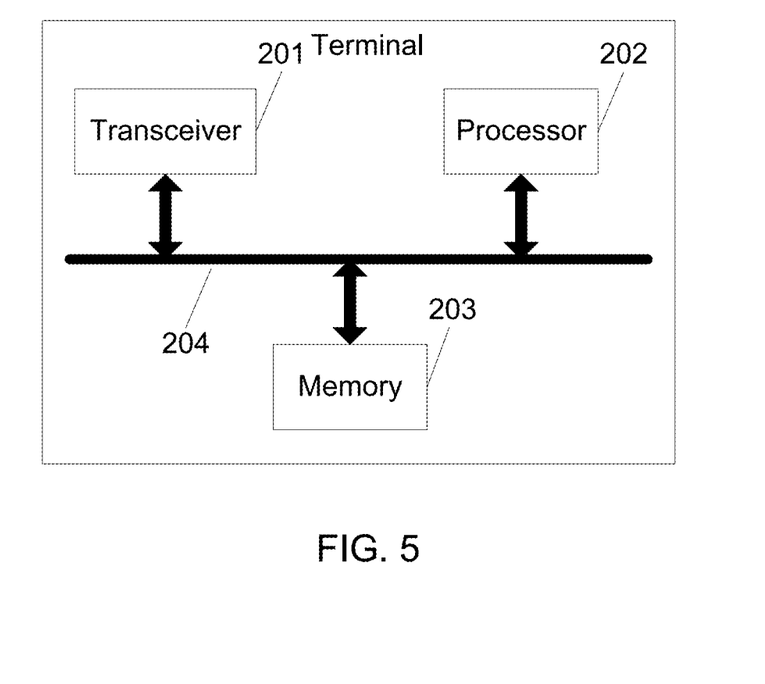
FIG. 5 is another optional schematic block diagram of a receiving UE.

FIG. 5 shows a schematic structure of a receiving UE. A UE includes a transceiver 201, a processor 202, a bus 204, and a memory 203. The transceiver 201 is used to communicate and interact with other UEs. The processor 202 is configured to support execution of corresponding functions of the receiving UE2 in FIG. 1. The memory 203 is coupled with the processor 202 and stores necessary program instructions and data of the receiving UE2 in FIG. 1.

In the exemplary embodiments, a non-transitory computer-readable storage medium including instructions is further provided, such as a memory including instructions that may be executed by a processor to implement the method described above. The non-transitory computer-readable storage medium may be a read-only memory (ROM), a random access memory (RAM), a magnetic disk or an optical disk.

Those skilled in the art may realize that units and algorithm steps of each example described with reference to the embodiments disclosed herein can be implemented as electronic hardware, or a combination of computer software and electronic hardware. Whether such functions are implemented by hardware or software depends on specific application and design constraints of the technical solution. Those skilled in the art may use different ways for each specific application to implement the described functions, but such implementation should not be regarded as going beyond the scope of the present disclosure. Those skilled in the art may clearly understand that for convenience and simplicity of the description, the specific working processes of the systems, apparatuses and units described above may refer to the corresponding processes in the aforementioned method embodiments, which will not be repeated herein.

In the embodiments disclosed herein, it should be understood that the disclosed methods and products (including, but not limited to, devices and apparatuses) may be implemented in other ways. For example, the apparatus embodiments described above are merely illustrative, and for example, the division of the units is only one type of logical functional division, and other division modes may be realized in practical implementation. For example, a plurality of units or components may be combined or integrated into another system, or some features may be ignored, or not executed. In addition, the shown or discussed mutual coupling or direct coupling or communication connection may be an indirect coupling or communication connection through some interfaces, devices or units, and may be in an electrical, mechanical or other form. The units described as separate parts may be or may not be physically separate, and parts displayed as units may be or may not be physical units, i.e., may be located in one position, or may be distributed on a plurality of network units. Some or all of the units may be selected according to actual needs to achieve the purpose of the solutions of the embodiments. In addition, each functional unit in the embodiments of the present disclosure may be integrated into one processing unit, or each unit may exist alone physically, or two or more units are integrated into one unit.

The functions may be stored in a computer-readable storage medium if they are implemented in the form of software functional units and sold or used as separate products. Based on such understanding, the technical solution of the present disclosure may be embodied in a form of a software product in essence or in a part contributing to the related art or in a part of the technical solutions. The computer software product is stored in a storage medium, and includes several instructions for causing a computer device (which may be a personal computer, a server, or a network device, etc.) to execute all or part of steps of the methods described in the embodiments of the present disclosure. The aforementioned storage medium includes various media capable of storing program codes such as a U disk, a mobile hard disk, a ROM, a RAM, a magnetic disk or an optical disk.

It will be understood by a person of ordinary skill in the art that all or part of the processes of the methods of the embodiments described above may be completed by controlling relevant hardware through a computer program, where the program may be stored in a computer-readable storage medium, and when the program is executed, the processes of the embodiments of the methods described above may be included. The storage medium may be a magnetic disk, an optical disk, a ROM or a RAM, etc.

It will be understood that, the flow diagrams and block diagrams in the accompanying drawings show the architecture, functions, and operations that are possibly implemented of systems, methods and computer program products according to the plurality of embodiments of the present disclosure. In this regard, each block in the flow diagrams or block diagrams may represent a module, a program segment, or a portion of a code, and the module, the program segment, or the portion of the code includes one or more executable instructions for implementing the specified logical functions. It will also be noted that, in some alternative implementations, the functions noted in the block may occur in an order different from that noted in the drawings. For example, two consecutive blocks may actually be executed in parallel, or sometimes be executed in a reverse order, depending on the function involved. It will also be noted that, each block in the block diagrams and/or flow diagrams, and a combination of blocks in the block diagrams and/or flow diagrams may be implemented by specialized hardware-based systems that perform the specified functions or actions, or by a combination of specialized hardware and computer instructions. The above modules may be one or more integrated circuits configured to implement the above methods, such as one or more application specific integrated circuits (ASIC), or one or more microprocessors, or one or more field programmable gate arrays (FPGA). For another example, when one of the above modules is implemented in a form of scheduling a program code by a processing element, the processing element may be a general-purpose processor, such as a central processing unit (CPU) or other processors that can call the program code. For another example, these modules may be integrated together and implemented in a form of system-on-a-chip (SOC). The present disclosure is not limited to the processes and structures described above and shown in the drawings, and various modifications and changes may be made without departing from the scope of the present disclosure. The scope of the present disclosure is limited only by the appended claims.

What is claimed is:

1. A method for communication between user equipments, comprising:
   determining, by a user equipment (UE), a physical control channel resource of a first frequency; and
   transmitting, by the UE, first control information on a physical control channel of the first frequency;
   wherein the first control information includes frequency indication information and/or resource indication information of a second frequency, the frequency indication information of the second frequency is used to indicate the second frequency, and the resource indication information of the second frequency is used to indicate an allocated/reserved resource of the second frequency; and
   after the UE transmits the first control information, the method further comprises:
   in a case where the first control information includes resource indication information of a physical sidelink control channel (PSCCH) of the second frequency, transmitting third control information on the PSCCH of the second frequency; or
   in a case where the first control information includes resource indication information of a PSCCH and a physical sidelink shared channel (PSSCH) of the second frequency, transmitting data on the PSSCH of the second frequency and transmitting third control information on the PSCCH of the second frequency;
   wherein the third control information includes the resource indication information of the PSSCH of the second frequency.

2. The method according to claim 1, wherein the first control information further includes frequency indication information and/or resource indication information of the first frequency; and the frequency indication information of the first frequency is used to indicate the first frequency, and the resource indication information of the first frequency is used to indicate an allocated/reserved resource of the first frequency.

3. The method according to claim 1, further comprising:
   transmitting, by the UE, second control information on the physical control channel of the first frequency; wherein the second control information includes frequency indication information and/or resource indication information of the first frequency; the frequency indication information of the first frequency is used to indicate the first frequency, and the resource indication information of the first frequency is used to indicate an allocated/reserved resource of the first frequency; and
   the first control information and the second control information have a same format or size; or the first control information and the second control information have different formats and sizes.

4. The method according to claim 3, wherein in a case where the first control information and the second control information have a same format or size:
   an independent domain in the first control information is used as frequency indication information and/or resource indication information; or
   a reserved bit in the first control information is used as frequency indication information and/or resource indication information; or
   a set domain in the first control information is used as frequency indication information and/or resource indication information; or
   frequency indication information and/or resource indication information are jointly encoded with at least one of other domains in the first control information; or
   frequency indication information and/or resource indication information are used to scramble a cyclic redundancy check (CRC) of the first control information.

5. The method according to claim 1, further comprising:
   determining, by the UE, the first frequency and/or the second frequency by one or more of the following ways:
   determining the first frequency and/or the second frequency according to configurations of a higher layer;
   selecting the first frequency and/or the second frequency according to service requirements;
   selecting the first frequency and/or the second frequency according to a configured priority;
   selecting the first frequency and/or the second frequency according to a signal intensity or a signal quality;
   selecting the first frequency and/or the second frequency according to an interference condition or an occupation ratio of a frequency;
   determining the first frequency and/or the second frequency according to network configurations;
   randomly selecting the first frequency and/or the second frequency; and
   determining the first frequency and/or the second frequency according to a pseudo-random function.

6. The method according to claim 1, wherein each frequency is a component carrier (CC) or a bandwidth part (BWP) or a resource pool.

7. The method according to claim 1, wherein the determining, by the UE, a PSCCH resource of the first frequency includes:
   determining, by the UE, the PSCCH resource of the first frequency according to scheduling or configuration of a network side; or competing, by the UE, in a set PSCCH resource pool to select and determine the PSCCH resource of the first frequency.

8. The method according to claim 1, wherein the first frequency and the second frequency are frequencies of a same sidelink transmission mode, or the first frequency and the second frequency are frequencies of different sidelink transmission modes; and
in a case where the first frequency and the second frequency are frequencies of different sidelink transmission modes, the first frequency is a component carrier (CC) or a bandwidth part (BWP) of LTE sidelink transmission mode, and the second frequency is a CC or a BWP of NR sidelink transmission mode.

9. A method for communication between user equipments, comprising:
sensing and/or monitoring, by a user equipment (UE), a physical control channel on a first frequency to obtain first control information; wherein the first control information includes frequency indication information and/or resource indication information of a second frequency; and the frequency indication information of the second frequency is used to indicate the second frequency, and the resource indication information of the second frequency is used to indicate an allocated/reserved resource of the second frequency;
wherein the method further comprises:
in a case where the first control information includes resource indication information of a physical sidelink control channel (PSCCH) of the second frequency, monitoring, by the UE according to indication of first control information, the PSCCH of the second frequency; and decoding the PSCCH to obtain third control information; or
in a case where the first control information includes resource indication information of a PSCCH and a physical sidelink shared channel (PSSCH) of the second frequency, monitoring, by the UE according to the indication of the first control information, the PSCCH of the second frequency; decoding the PSCCH to obtain third control information; and receiving a PSSCH of the second frequency;
wherein the third control information includes the resource indication information of the PSSCH of the second frequency.

10. The method according to claim 9, further comprising:
receiving, by the UE according to indication of the third control information, the PSSCH of the second frequency; or
comparing, by the UE, a PSSCH resource of the second frequency indicated by the third control information with a PSSCH resource of the second frequency indicated by first control information; and performing a preset operation if the two are different.

11. The method according to claim 9, further comprising:
selecting, by the UE, one or more frequencies from frequencies indicated by the first control information and/or the third control information to receive the PSSCH.

12. The method according to claim 11, wherein the UE selects, according to at least one of a priority, quality of service (QoS), or a transmission mode, one or more frequencies to receive the PSSCH.

13. The method according to claim 9, further comprising:
reporting, by the UE, available resources on the second frequency.

14. The method according to claim 9, wherein the first frequency is a frequency of a first sidelink transmission mode, and the second frequency is a frequency of a second sidelink transmission mode; or, both the first frequency and the second frequency are frequencies of the first sidelink transmission mode.

15. A user equipment, comprising a processor and a transceiver, wherein
the processor is used to determine a physical control channel resource of a first frequency; and
the transceiver is used to transmit first control information on a physical control channel of the first frequency;
wherein the first control information includes frequency indication information and/or resource indication information of a second frequency, the frequency indication information of the second frequency is used to indicate the second frequency, and the resource indication information of the second frequency is used to indicate an allocated/reserved resource of the second frequency; and
the transceiver is further used to transmit third control information on a PSCCH of the second frequency, in a case where the first control information includes resource indication information of the physical sidelink control channel (PSCCH) of the second frequency; or the transceiver is further used to transmit data on a physical sidelink shared channel (PSSCH) of the second frequency and transmit third control information on a PSCCH of the second frequency, in a case where the first control information includes resource indication information of the PSCCH and the PSSCH of the second frequency.

16. The user equipment according to claim 15, wherein the transceiver is further used to transmit second control information on the physical control channel of the first frequency; the second control information includes frequency indication information and/or resource indication information of the first frequency; and the frequency indication information of the first frequency is used to indicate the first frequency, and the resource indication information of the first frequency is used to indicate an allocated/reserved resource of the first frequency.

17. The user equipment according to claim 15, wherein the processor is further used to determine the first frequency and/or the second frequency by one or more of the following ways:
determining the first frequency and/or the second frequency according to configurations of a higher layer;
selecting the first frequency and/or the second frequency according to service requirements;
selecting the first frequency and/or the second frequency according to a configured priority;
selecting the first frequency and/or the second frequency according to a signal intensity or a signal quality;
selecting the first frequency and/or the second frequency according to an interference condition or an occupation ratio of a frequency;
determining the first frequency and/or the second frequency according to network configurations; and
randomly selecting the first frequency and/or the second frequency, or determining the first frequency and/or the second frequency according to a pseudo-random function.

18. The user equipment according to claim 15, wherein the processor is configured to:

determine the PSCCH resource of the first frequency according to scheduling or configuration of a network side; or compete in a set PSCCH resource pool to select and determine the PSCCH resource of the first frequency.

19. The user equipment according to claim 15, wherein the first frequency and the second frequency are frequencies of a same sidelink transmission mode, or the first frequency and the second frequency are frequencies of different sidelink transmission modes; and in a case where the first frequency and the second frequency are frequencies of different sidelink transmission modes, the first frequency is a component carrier (CC) or a bandwidth part (BWP) of LTE sidelink transmission mode, and the second frequency is a CC or a BWP of NR sidelink transmission mode.

* * * * *